No. 821,882. PATENTED MAY 29, 1906.
J. A. PERKINS.
ROLLER BEARING.
APPLICATION FILED NOV. 14, 1903.
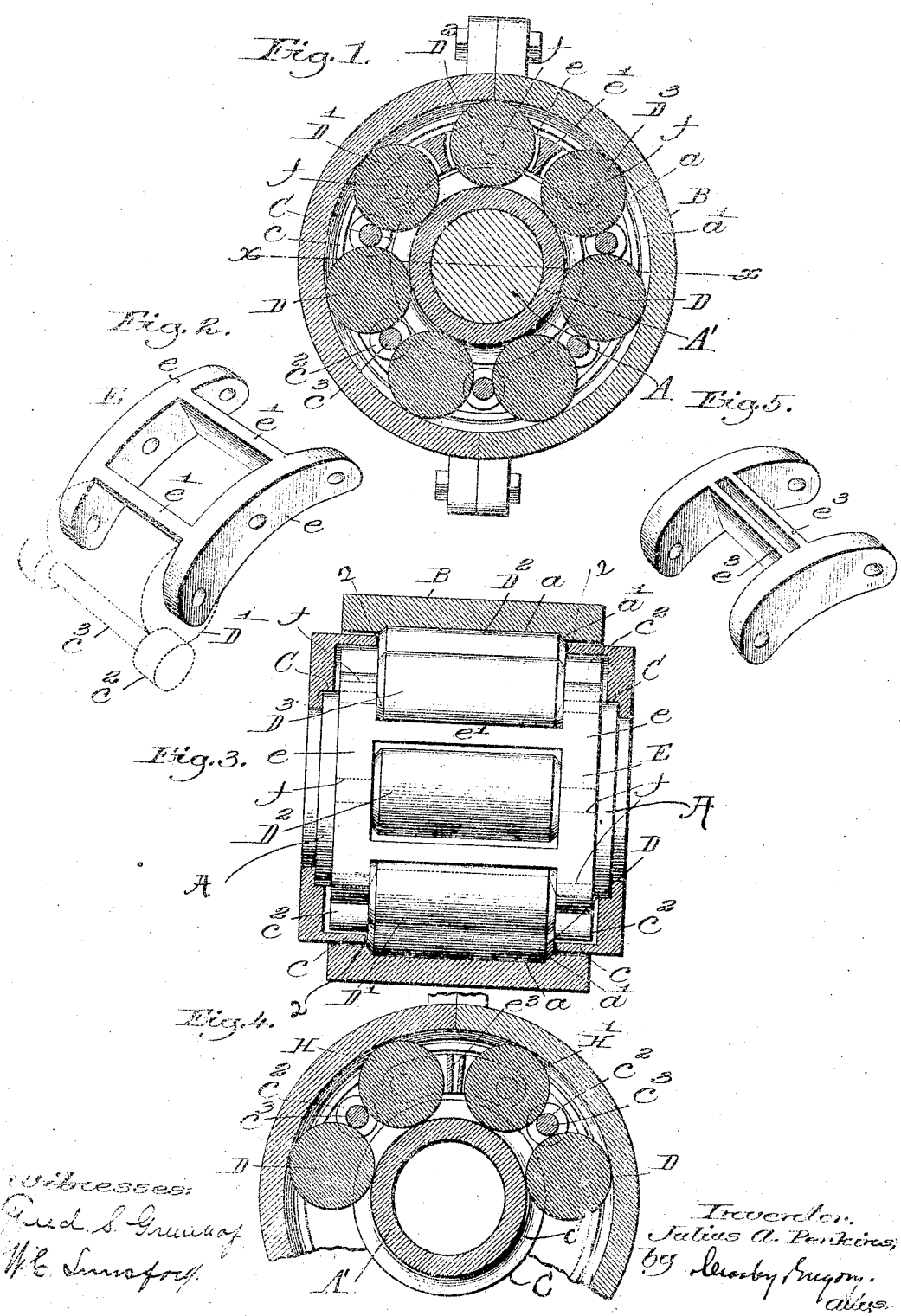

UNITED STATES PATENT OFFICE.

JULIUS A. PERKINS, OF OMAHA, NEBRASKA, ASSIGNOR TO MOFFETT BEARING COMPANY, OF COUNCIL BLUFFS, IOWA.

ROLLER-BEARING.

No. 821,882.     Specification of Letters Patent.     Patented May 29, 1906.

Application filed November 14, 1903. Serial No. 181,134.

*To all whom it may concern:*

Be it known that I, JULIUS A. PERKINS, a citizen of the United States, residing at Omaha, in the county of Douglas, State of Nebraska, have invented an Improvement in Roller-Bearings, of which the following description, in connection with the accompanying drawings, is a specification, like letters on the drawings representing like parts.

This invention has for its object to improve that class of roller-bearings wherein a series of bearing-rollers contacting diametrically at opposite points with the axle and box have interposed between them a series of separators that travel with the bearing-rollers in their planetary motion about the axle.

My present invention has been devised to prevent any possibility of the longitudinal axes of the bearing-rollers getting out of parallelism with the longitudinal axis of the axle.

I have found in practice that any deviation from true and correct parallelism between the bearing-rollers and the axle is detrimental to the best preformance of the bearing, and consequently I have devised a novel bearing having as a part thereof a rider that sustains a plurality of bearing-rollers maintained therein in absolute parallelism. These bearing-rollers, sustained in the rider with their longitudinal axis in exact parallelism, serve as leaders to maintain the bearing-rollers outside of the leaders and the separators in parallelism.

The endmost bearing-rollers of the rider contact with different separator-rollers interposed between the said endmost rollers and other bearing-rollers of the set of rollers which are sustained outside of the rider, and in this way it is possible to maintain all the bearing-rollers and the separators in their true working relation with their longitudinal axes in line with the longitudinal axis of the axle.

Figure 1, in cross-section, represents an axle and box, a rider provided with leader-rolls, and a series of bearing-rollers coacting in accordance with my invention. Fig. 2 is a detail showing the rider detached, with a leader-roller and to separator indicated by dotted lines. Fig. 3 is a plan view of the parts shown in Fig. 1 with the top of the box removed on the dotted line $x$. Fig. 4 shows a section similar to Fig. 1, but with a modified form of rider; and Fig. 5 shows the rider detached.

$A'$ represents a steel tube that will surround and constitute part of an axle. This tube presents two circular tracks $C\ C'$, the inner flanges $c$ of which serve as raceways on which may travel the enlarged heads or ends $c^2$ of the separators $c^3$.

B is a box shown as cut away at its exterior (see Fig. 3) to constitute a roller-bearing-receiving space $a$, the side walls of which are beveled, as shown at $a'$.

The bearing-rollers D contact with the sleeve and also with the interior of the box, and the ends of the bearing-rollers run close to the inturned flanges $c$ of the circular tracks C, carried by the steel tube.

In accordance with my invention I have devised a rider E, (shown detached in Fig. 2,) composed of side pieces $e$ and connected ribs $e'$, the rider being thus made absolutely rigid. This rider sustains in Fig. 1 three leader-rollers $D'\ D^2\ D^3$, and viewing Figs. 1 and 2 the reduced portions $c^3$ of the separators contact with the peripheries of the endmost leader-rolls $D'$ and $D^3$ of the rider, the bearing-rollers D (shown as four) and the separators $c^3$ (shown as five) contacting one with the other, as represented in the drawings, Fig. 1.

It will be understood that either the axle and its sleeve will rotate and the box remain at rest or the box may rotate and the axle and its sleeve remain at rest.

In either case the rider and the series of bearing-rollers and separators will travel in the same direction as the rotative member travels, but at a slower speed, and as the bearing-rollers, the leader-rolls, and separators travel in their planetary motion about the longitudinal axis of the axle it will be understood that the rider sustaining the spindles $f$ of the leader-rollers $D'\ D^2\ D^3$ maintains said spindles and the rollers surrounding them in substantially true parallelism with the longitudinal axis of the axle, and as these leader-rollers cannot possibly deviate so that their longitudinal axes can get out of parallelism with the longitudinal axis of the axle it follows that the bearing-rollers D are maintained by the leader-rollers of the rider in such position that their longitudinal axes will always remain in correct parallelism with the longitudinal axis of the axle.

I have found in practice where the bearing-rollers and the separators are maintained in parallelism each with the other and with the longitudinal axis of the axle simply by contact of one roller with another that in case a bearing-roller loses its parallelism the bearing is apt to be injured or destroyed or fails to operate properly.

In Figs. 4 and 5 I have shown a modified form of rider in which the two end pieces are united by two narrower ribs $e^3$, the end pieces being adapted to sustain two spindles carrying leader-rolls H H', whereas in Figs. 1 to 3 the rider sustains three leader-rolls.

I prefer to sustain the leader-rolls in the rider by spindles extended through axial holes in each roll, the rolls and spindles being prevented from contacting one with the other by balls as provided for in United States Patent No. 664,820, dated December 25, 1900; but I consider as within the scope of my present invention the sustaining of the leader-rollers of the rider in any usual manner so that they may rotate therein and yet be kept in parallelism one with the other.

Instead of the particular form of separators shown I may substitute without departing from my invention any usual form of separator that is commonly interposed between bearing-rollers having a planetary motion and applied loosely between an axle and box.

I have omitted from Fig. 4 some of the rollers D and separators, as they are shown in Fig. 1.

It will be understood that the steel tube A' forms part of the axle, which is shown in section-lines only in Fig. 1 and designated A.

Having described my invention, what I claim, and desire to secure by Letters Patent, is—

1. In a roller-bearing, an axle, a box, a rider, a plurality of leader-rolls sustained therein, and a series of detached bearing-rollers and separators maintained in parallelism with and by said leader-rolls.

2. In a roller-bearing, an axle, a box, a series of bearing-rollers and separators interposed between said axle and box, a rider, and a plurality of leader-rolls mounted therein, said leader-rolls maintained with their axes in parallelism serving to maintain the axes of the bearing-rollers and separators in parallelism.

3. In a roller-bearing, an axle, a box, a rider, a plurality of leader-rolls sustained therein, and a series of detached bearing-rollers and interposed separators, said detached rollers and separators traveling with the rider and its leader-rolls in their movement about the longitudinal axis of the axle.

In testimony whereof I have signed my name to this specification in the presence of two subscribing witnesses.

JULIUS A. PERKINS.

Witnesses:
GEO. W. GREGORY,
EDITH M. STODDARD.